(12) United States Patent
Shirai et al.

(10) Patent No.: US 6,988,178 B1
(45) Date of Patent: Jan. 17, 2006

(54) EMULATION PROCESSING METHOD FOR A STORAGE DEVICE AND STORAGE DEVICE

(75) Inventors: Katsumi Shirai, Yokohama (JP); Kiyotaka Fukawa, Kawasaki (JP); Takahiro Nakano, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 964 days.

(21) Appl. No.: 09/676,447

(22) Filed: Sep. 29, 2000

(30) Foreign Application Priority Data

Dec. 17, 1999 (JP) .................................. 11-360006

(51) Int. Cl.
*G06F 12/00* (2006.01)

(52) U.S. Cl. ...................... 711/200; 711/170; 369/53.1; 369/83

(58) Field of Classification Search ................ 711/113, 711/200–201, 170–171; 369/83–85, 47.36, 369/53.21

See application file for complete search history.

(56) References Cited

U.S. PATENT DOCUMENTS 5,136,569 A * 8/1992 Fennema et al. ........ 369/53.23
5,459,850 A * 10/1995 Clay et al. ................... 711/171
5,652,865 A * 7/1997 Rawlings, III .............. 711/171

FOREIGN PATENT DOCUMENTS

| JP | 414127 | 1/1992 |
| JP | 4165527 | 6/1992 |
| JP | 8328748 | 12/1996 |
| JP | 9146710 | 6/1997 |

* cited by examiner

*Primary Examiner*—Nasser Moazzami
(74) *Attorney, Agent, or Firm*—Greer, Burns & Crain, Ltd.

(57) ABSTRACT

This invention relates to the emulation processing method of a storage device and the storage device for accessing storage medium from a host that has a different sector size, and where alternate processing is performed in the sector unit of storage medium even when there is a writing error when updating the disk. In a system where a second sector size of a host is smaller than a first sector size of the storage medium, data that are staged in a buffer according to a request from the host is rewritten using write data, and then staged sector data or the rewritten sector data are saved in an alternate area and the storage medium is updated with the rewritten sector data. Since the sector data before updating is saved beforehand, it is possible to perform alternate processing using the sector unit of the storage medium.

18 Claims, 9 Drawing Sheets

2048 SECTOR

512 Byte sector

PRIOR ART

MAGNETO-OPTICAL DISK DEVICE

FIG. 11

PRIOR ART

EMULATION PROCESSING METHOD FOR A STORAGE DEVICE AND STORAGE DEVICE

BACKGROUND OF THE INVENTION

1. Field of the Invention

This invention relates to a storage device and an emulation processing method for accessing a storage medium having a first sector length unit by a command with a second sector length unit that is shorter than the first sector length unit, and more particularly to a storage device and an emulation processing method for the storage device for protecting data of an address other than the target address from a write error.

2. Description of the Related Art

As host performance improves, the capacity of storage media, such as disks, is doubling every year. Due to this increase in capacity of the storage medium, the sector length has become longer. However, there are some host OS that do not correspond to the change in sector length. Therefore, emulation technology, that can size-convert to the sector length units of the storage medium by a command with a sector length of the host OS, is necessary.

For a disk such as an optical disk, reading and writing is performed in sector units. This sector is broken up by a sector ID, and is set a user area (data area) having a specified length. For example, a sector length of 512 bytes is mainstream. However, with the recent demand for larger capacity disks, disks with a sector length of 1024 bytes or 2048 bytes are now provided. Increasing the sector length in this way makes it possible to increase the user area, and thus increase the disk capacity.

On the other hand, the OS (file system) that uses this disk defines the sector size and specifies the address. For example, in the UNIX system, the recognized sector size is 512 bytes. In a file system such as UNIX, a 512-byte sector size disk was used. However, it is desired to be able to use large-capacity disks (2048 bytes) as mentioned above with a file system such as UNIX as well.

Figure 10:
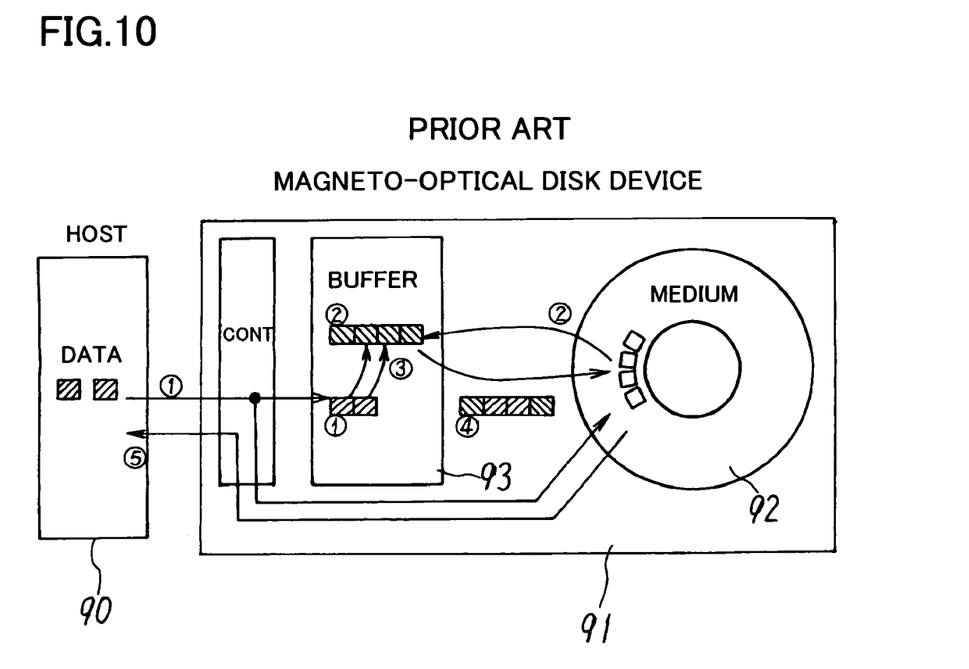
FIG. 10 is a drawing explaining the prior emulation process.
Figure 11:
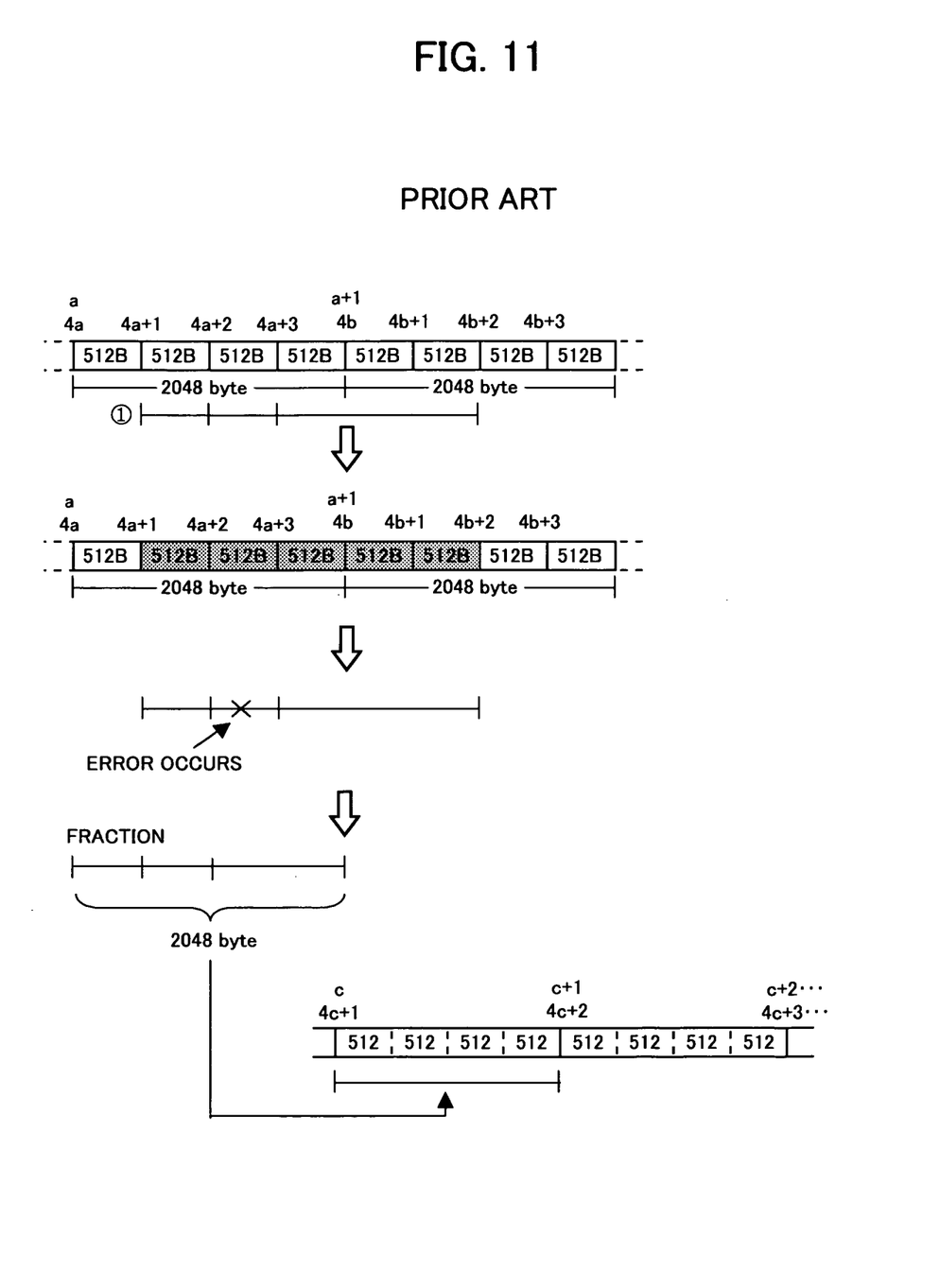
FIG. 11 is a drawing explaining the prior emulation operation.

In order to use a 2048-byte sector disk in this environment with a 512-byte sector, so-called emulation technology that converts the sector size has been proposed (for example, Japanese Unexamined published patent No. H4-165527, U.S. Pat. No. 5,485,439, Japanese Unexamined published patent No. H4-14127 and Japanese Unexamined published patent No. H9-146710). FIG. 10 and FIG. 11 explain this prior emulation process.

FIG. 10 shows a file system that uses a magneto-optical disk device 91 in which the disk medium 92 stores data in sector length units of 2048 bytes (first sector length). On the other hand, the OS of the host 90 accesses a file in 512-byte units (second sector length). The relationship between the sectors recognized by this host and the actual sector size of the disk is as shown in FIG. 11. In other words, the sector addresses of the host for the actual sectors of sector address 'a' of the disk are: $4a$, $4a+1$, $4a+2$ and $4a+3$.

Conversion of this sector size is performed as follows. First, the sector address from the host 90 is converted to the actual sector size of the disk 92. For example, when host sector addresses '$4a+1$' to '$4b+2$' are received from the host 90, they are converted to actual sector addresses 'a' and '$a+1$' of the disk 92. And the sector data of this actual sector address is read to a buffer 93 from the disk 92 (this is called staging).

In response to a read command, data of the specified host sector addresses '$4a+1$' to '$4b+2$' are obtained from the read sectors 'a' and '$a+1$', and transferred to the host 90.

On the other hand, in response to a write command, this staged sector data 'a' and '$a+1$' are updated by write data of the host sector addresses '$4a+1$' to '$4b+2$'. Next, the updated data are written to the disk 92 in actual sector units 'a' and '$a+1$'.

In this way, the emulation operation reads the data of the address before and after that of the target address and updates it. When a write error occurs when writing to the disk 92, an alternate sector process is performed the same as in normal disk control. Generally, the objective of the alternate process is to save the host data without the assumption of a retry from the host. Therefore, conventionally, the write data from the host is written in an alternate area of the disk 92. For example, as shown in FIG. 11, when a write error occurs in the write data from host sector address '$4a+2$', the 2048-byte data of the sector address 'a' of this drive is saved in an alternate area.

However, in the prior alternate processing, when writing of alternation does not end normally, a retry operation called alternation is performed. However even in that case when all writing does not end normally, the writing process ends in error and processing ends without all of the data being written.

Therefore, there is the problem that all of the data of that sector of the disk is lost from the drive and medium. Particularly in the emulation process, there is the problem that data of an address that is not the target for writing is deleted.

SUMMARY OF THE INVENTION

The objective of this invention is to provide a storage device and an emulation processing method for the storage device for protecting data even when a write error occurs during emulation.

Another objective of this invention is to provide a storage device and an emulation processing method for the storage device for saving all of the read data.

A further objective of this invention is to provide a storage device and an emulation processing method for the storage device for protecting data without a drop in emulation speed.

The emulation processing method for a storage device of this invention comprises: a step of reading data of an address that is specified with a second sector length unit from the storage medium with a first sector length unit; a step of rewriting the data that is read with the first sector length unit into data with the second sector length unit; a step of saving the data that is read or rewritten in the first sector length unit; a step of writing the rewritten data to the storage medium; and a step of registering the saved data as alternate data when the writing fails.

Moreover, the storage device of this invention comprises a buffer memory, and a control circuit for reading the data of the address specified with a second sector length unit from the storage medium to the buffer memory with a first sector length unit, and then rewriting the data that have been read with the first sector length unit to data with the second sector length unit, and writing the rewritten data to the storage medium. In addition, the control circuit saves the data that is read or rewritten with the first sector length unit to save area, and registers that saved data as alternate data when writing fails.

In this form of the invention, first, before the data that are rewritten with the actual sector unit are written to the storage medium, the data that is read or rewritten with the first sector length unit are saved, so that when a write error occurs during writing, it is possible to save the data that is saved with the first sector length unit as alternate data. Therefore, by making this data of the first sector length unit as the alternate data, access with the first sector length unit is possible with this alternate data even when receiving a read command.

Second, the area that is used for rewriting is normally the work area of the memory, so normally it is cleared when writing to the disk in order for the next process. Therefore, it is not possible to use the data in the area used for rewriting as alternate data. In this invention, the data that are read or rewritten with the first sector length unit are saved, so the highly reliable alternation processing is possible.

In the emulation processing method of another form of the invention, the saving step comprises a step of saving the data with the first sector length unit to the storage medium. Moreover, the control circuit saves the data with the first sector length unit to the storage medium.

In this form of the invention, a storage medium is used for saving the data. Therefore, when compared to using memory, data are securely saved and the medium can be used as is, as the alternate area.

The emulation processing method of another form of the invention comprises: a step of determining whether or not the corresponding data with the first sector length unit has all been rewritten from the target address with the second sector length unit for which there is a rewrite request; a step of executing the save step when all of the data have not been rewritten; a step of registering to the storage medium as alternate data, the data with the second sector length unit and for which there was a rewrite request when the writing fails, when all of the data have been rewritten.

Moreover, the control circuit determines whether or not the corresponding data with the first sector length unit has all been rewritten from the target address with the second sector length unit for which there is a rewrite request, execute the save step when all of the data have not been rewritten, and register to the storage medium as alternate data, the data with the second sector length unit and for which there was a rewrite request when the writing fails, when all of the data have be rewritten.

In this form of the invention, when all of the data with the first sector length are rewritten, performing of the save process is stopped. In other words, when this save process is performed, the time required for the emulation process becomes longer. On the other hand, when all of the data with the first sector length are rewritten, the write data are data with the first sector length, so by using this fact, it is possible to prevent the emulation time from becoming longer due to performing the alternate processing.

DESCRIPTION OF THE PREFERRED EMBODIMENTS

The embodiments of this invention will be explained in the order of storage device, emulation process, and other emulation process.

Storage Device

Figure 1:
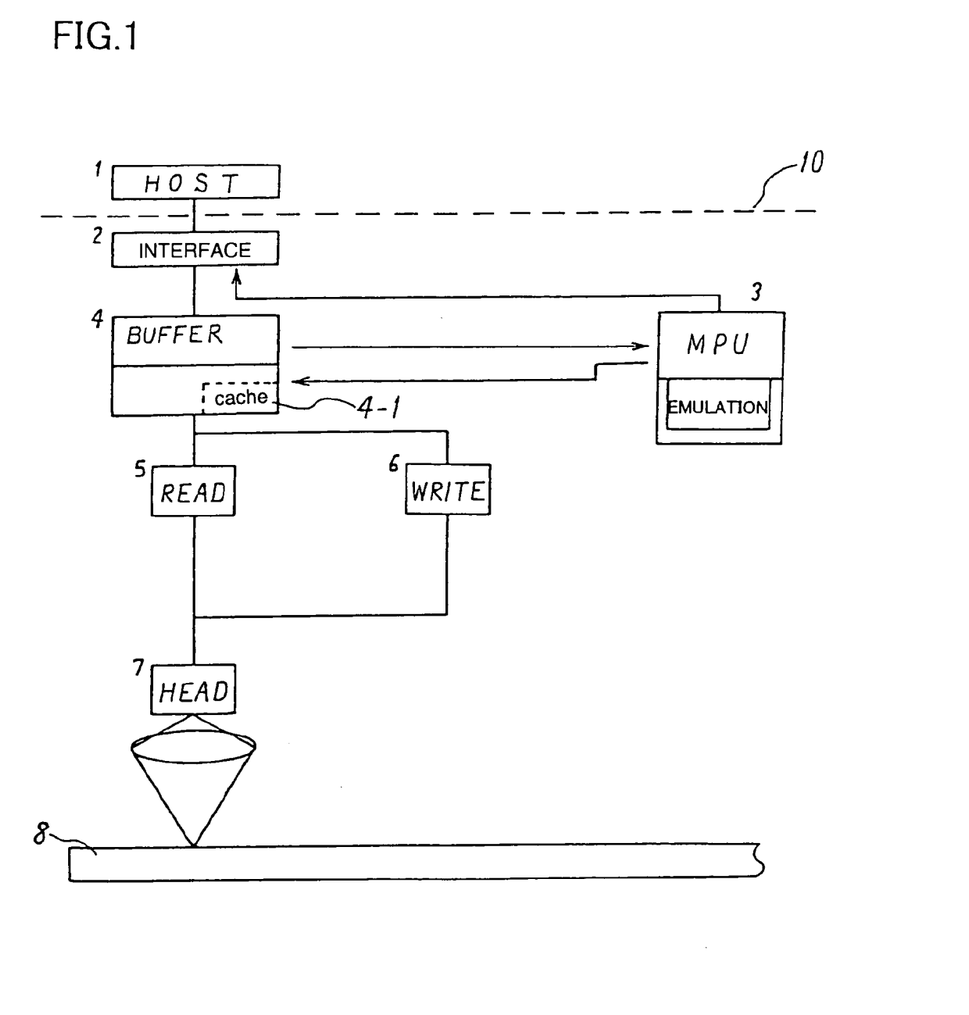
FIG. 1 is a block diagram of the file system of an embodiment of the invention.
Figure 2:
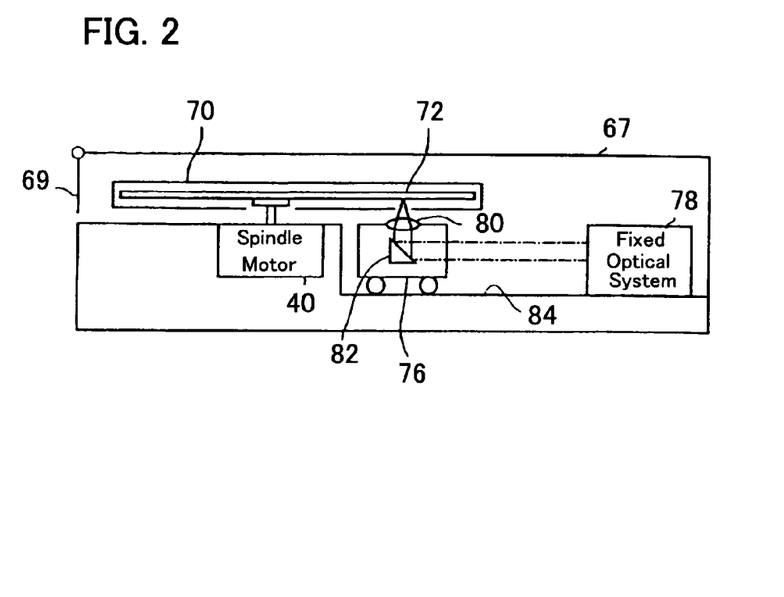
FIG. 2 is configuration diagram of the optical disk drive in FIG. 1.
Figure 3:
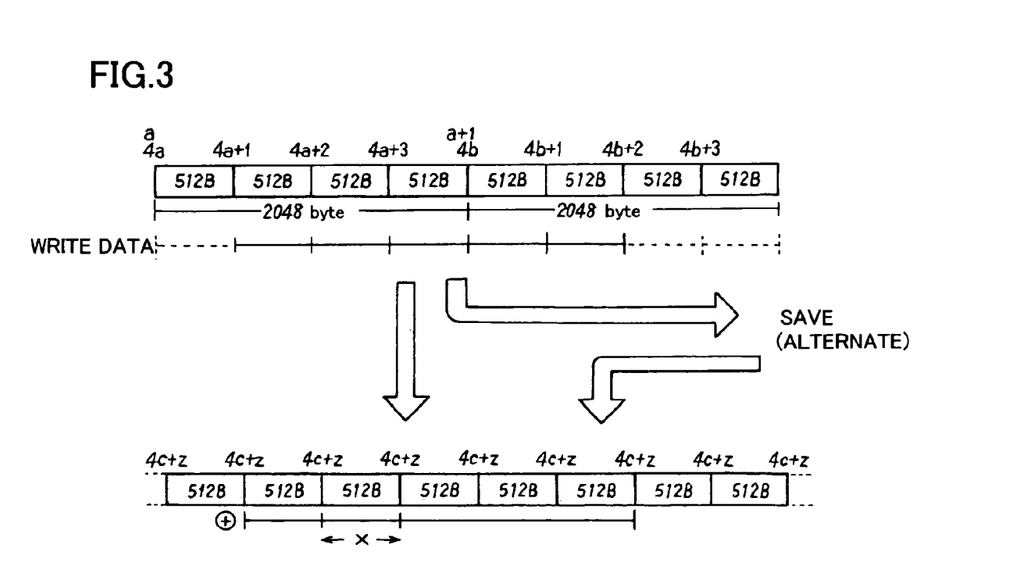
FIG. 3 is a drawing explaining the emulation process in FIG. 1.
Figure 4:
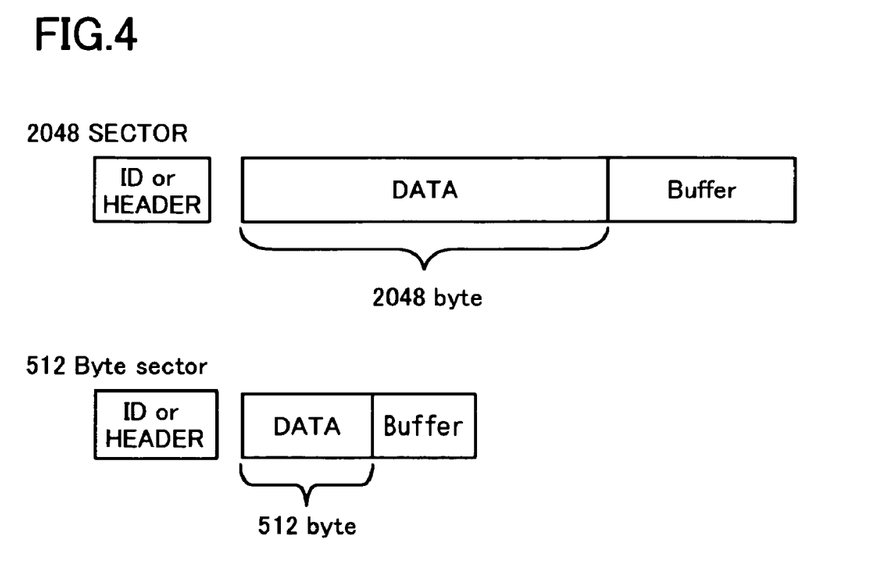
FIG. 4 is a drawing explaining the sector of the disk in FIG. 2.

FIG. 1 is a block diagram of the file system of an embodiment of the invention. FIG. 2 is a configuration drawing of the optical disk drive in FIG. 1. FIG. 3 is a drawing that explains the emulation process in FIG. 1, and FIG. 4 is a drawing explaining the sector format. FIG. 1 and FIG. 2 show a magneto-optical disk device as the storage device.

As shown in FIG. 1, a host 1 has an OS that is a UNIX OS and its recognizable sector length is 512 bytes. A magneto-optical disk device 10 is connected to the host 1. An interface 2 exchanges commands and data with the host 1. A MPU (microprocessor) 3 performs overall control of the magneto-optical disk device. A buffer memory 4 stores write data and read data as well as has a cache area 4-1.

A write LSI circuit 6 comprises a write modulation unit and laser diode control circuit. The write modulation unit modulates the write data, according to the type of magneto-optical disk, into bit-position modulation (PPM) record (called mark record) data format or pulse-width modulation-(PWM) record (called edge record) data format. The laser diode control circuit controls the intensity of the laser beam of the optical head of the drive 11 according to this modulated data.

A read LSI circuit 5 comprises: a read demodulation unit, having an AGC (auto gain control) circuit, filter and sector mark detection circuit; and a frequency synthesizer. The read demodulation unit generates a read clock and read data from an input ID signal or MO signal, and then demodulates the PPM data or PWM data into the original NRZ data.

The optical head 7 of the drive 11 detects the light returning from the magneto-optical disk 8, and inputs the ID signal/MO signal to a read circuit 5. As shown in FIG. 2, a spindle motor 40 rotates the magneto-optical disk 8. The spindle motor 40 is located in a housing 67. A magneto-optical disk cartridge 70 is inserted from an inlet 69. The magneto-optical disk 8 inside the cartridge 70 is rotated by the spindle motor 40.

The optical head 7 comprises a carriage 76 and fixed optical system 78. The carriage 76 moves along a rail 84 by a VCM (not shown in the figure) in a direction that crosses the tracks of the magneto-optical disk 8. The carriage 76 comprises an objective lens 80, direction conversion prism 82, focus actuator, track actuator, etc. The fixed optical system 78 comprises the aforementioned laser diode unit, ID/MO detector and 4-division detector.

As shown in FIG. 1, there is an emulation function in the MPU 3. The basic operation of this emulation function is explained by FIG. 3 and FIG. 4.

As shown in FIG. 4, a sector of the magneto-optical disk 8 comprises a sector ID and user area (data area) with a sector length of 2048 bytes. There is a buffer area located outside of the user area. For comparison, the format of a 512-byte sector is shown. The 2048-byte sector has an advantage capacity wise. On the other hand, the OS of the host 1 accesses files in 512-byte units (second sector length). The relationship between the sector recognized by the host and the actual sector of the disk is shown in FIG. 3, where the sector addresses of the host are '4a', '4a+1', '4a+2' and '4a+3' with respect to the actual sector of sector address 'a' of the disk.

First, the sector addresses from the host 1 are converted to an actual sector addresses of the disk 8. In FIG. 3, when the host sector addresses '4a+1' to '4b+2' of five sectors from the host 1 are received, they are converted to the two actual sector addresses 'a' and 'a+1' of the disk 8. Also, the sector data of the actual sector addresses are read from the disk 8 into a cache area 4-1 (this is called staging).

In response to a read command, data of the specified five host sector addresses '4a+1' to '4b+2' are extracted from the read sectors 'a' and 'a+1' and transferred to the host 1.

On the other hand, in response to a write command, the staged sector data 'a' and 'a+1' are rewritten by the write data of the five host sector addresses '4a+1' to '4b+2'. Next, the updated data or read data are written in an alternate area (for example the buffer area of the disk 8 in FIG. 4) in units of actual sectors 'a' and 'a+1' (this is called saving).

Then, the updated data are written to the disk 8 in actual sector units 'a' and 'a+1'. When an error occurs while writing to the disk 8, the data in the alternate area are used as alternate data.

In this way, before writing to the disk 8, the updated data or read data are saved in the alternate area (for example the buffer area of the disk 8 in FIG. 4) in actual sector units 'a' and 'a+1', so when a write error occurs while writing, it is possible to save the saved data with first sector length units as alternate data, and even when receiving a read command, access in the first sector length units is possible using this alternate data.

Moreover, the area which is used for rewriting (cache area) is the work area, so normally it is cleared when writing to the disk 8 in order for the next process. Therefore, it is not possible to use data in the area used for rewriting as alternate data. In this invention, the data with the first sector length unit that are read or rewritten are saved, so highly reliable alternate processing is possible.

The storage device can use a storage device to store the data in sector units, that is, besides a magneto-optical disk, it is possible to use an optical disk, magnetic disk or the like. Moreover, an explanation is given of using a combination of a 2048-byte disk and 512-byte host, however other combinations are also possible. Furthermore, emulation processing is executed in the disk device, however, it can also be executed in another device connected to the disk device, such as an SCSI board.

Emulation Processing

Figure 5:
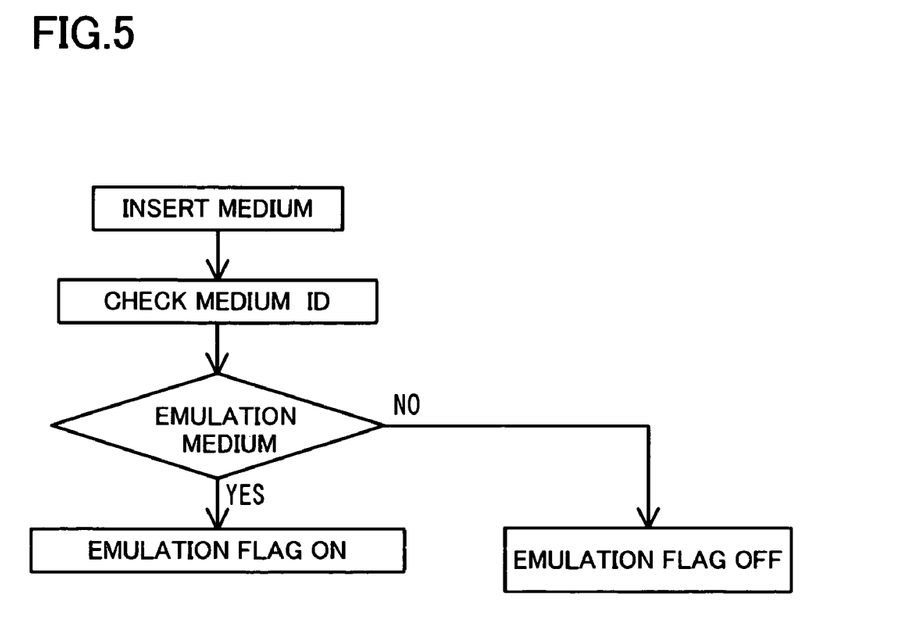
FIG. 5 is a flowchart of the initial process when inserting the medium of an embodiment of the invention.

FIG. 5 is a flowchart of the initial process after inserting the medium of an embodiment of the invention.

When the disk 8 is inserted, the control area of the disk 8 is read and the medium identifier is checked. When the medium identifier indicates an emulation medium, it is recognized as an emulation medium and the emulation flag is turned ON. On the other hand, when the medium identifier indicates that the medium is not an emulation medium, then it is not recognized as an emulation medium and the emulation flag is turned OFF. Emulation processing is only performed when the emulation flag is ON.

Figure 6:
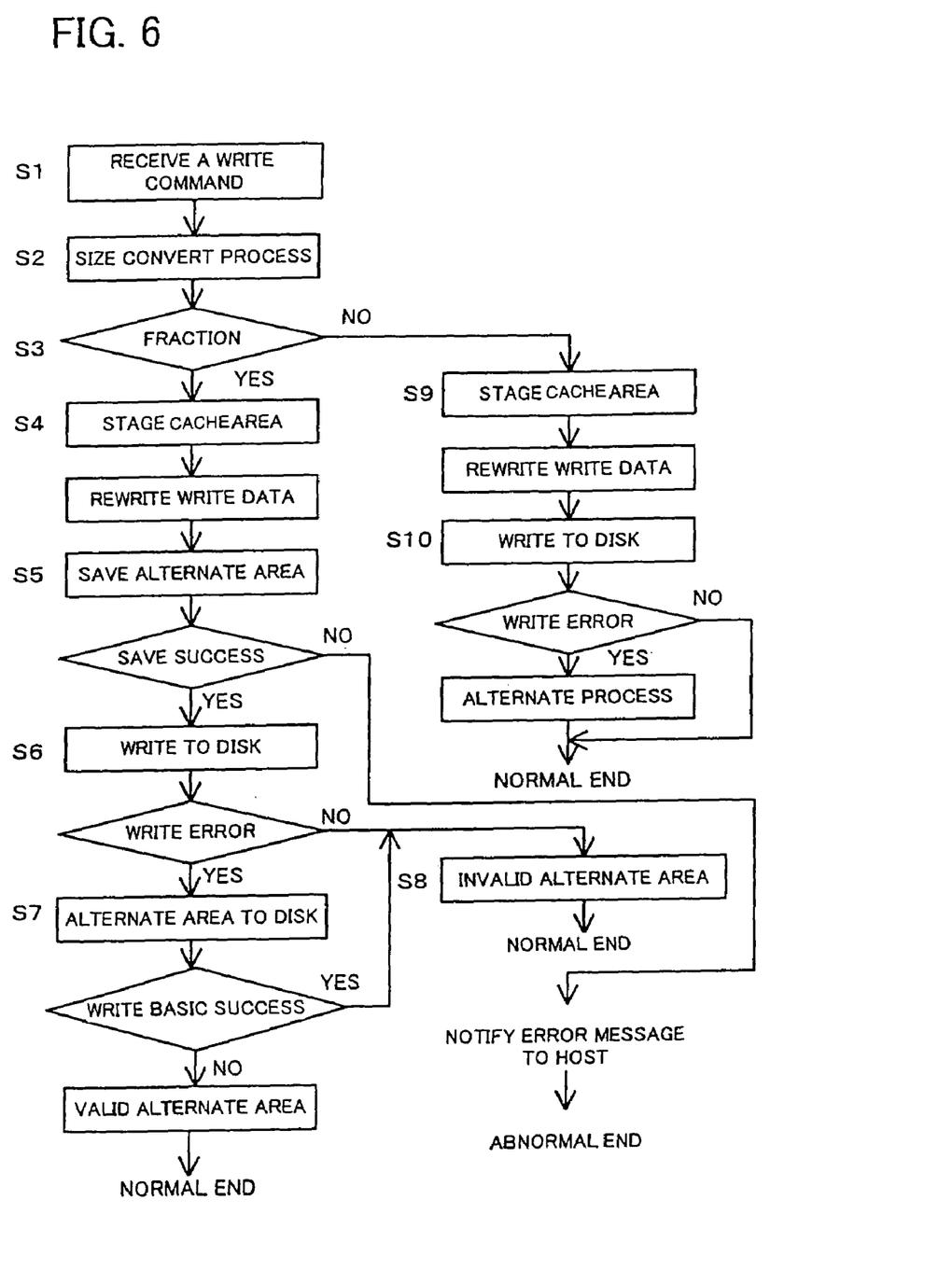
FIG. 6 is a flowchart of the emulation process of an embodiment of the invention.
Figure 7:
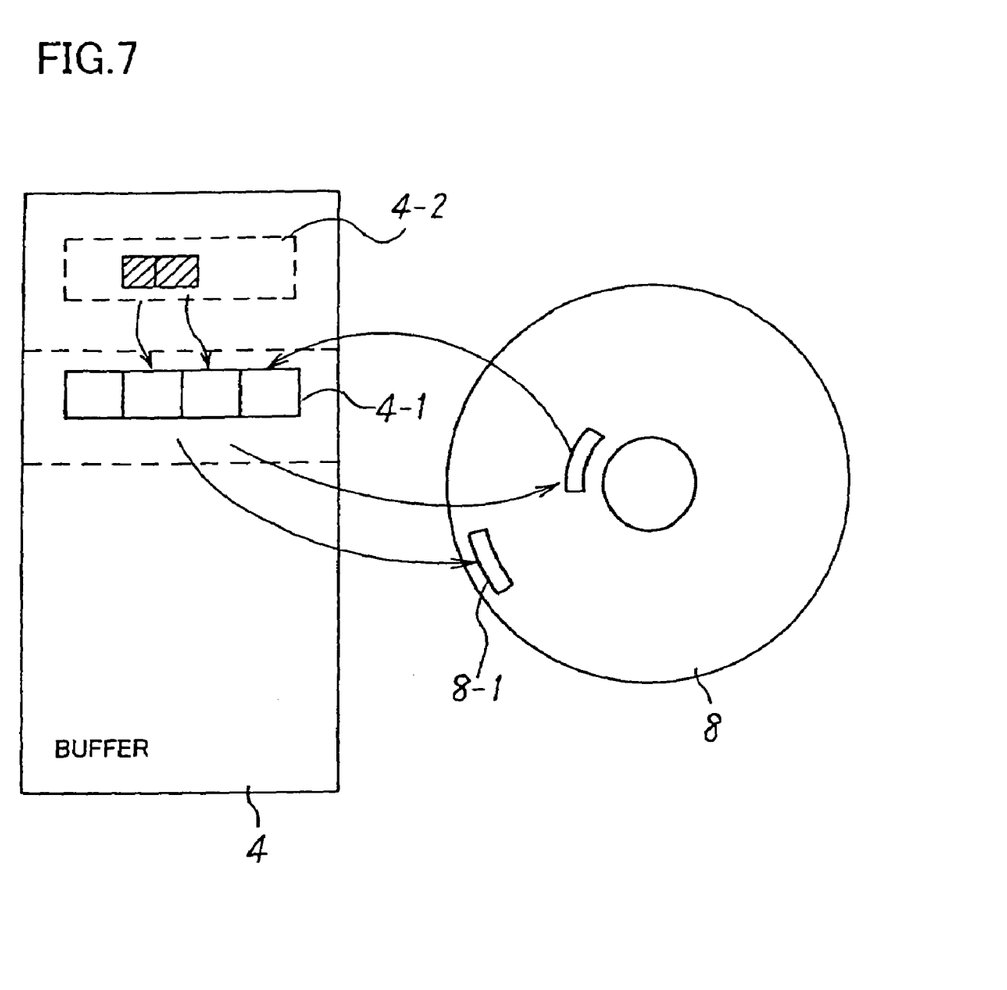
FIG. 7 is a drawing explaining the write emulation operation in FIG. 6.

FIG. 6 is a flowchart of the emulation process of an embodiment of the invention, and FIG. 7 is a drawing explaining the write emulation operation in FIG. 6.

(S1) The write command is received from the host 1. When it is a SCSI command, it is operation-code, logical block address (LBA) and number of blocks. In the write command, writing is specified in the operation-code. The logical block address and number of blocks are defined in 512-byte units as mentioned above.

(S2) When the MPU 3 receives the write command by way of the interface 2, it performs the size conversion process. In this case, the disk 8 has 2048-byte sectors so it is four times the host sector size. Therefore, the start sector address obtained from the LBA ('4a+1' in FIG. 3) is divided by four, and with the quotient remaining after discarding everything beyond the decimal point, it is converted to the disk sector address ('a' in FIG. 3) to which the start host sector belongs. Also, the value beyond the decimal point is a fraction. Similarly, the end sector address ('4b+1' in FIG. 3) is obtained from the LBA and number of blocks. This is divided by four, and with the quotient remaining after discarding everything beyond the decimal point, (remainder), it is converted to the disk sector address ('a+1' in FIG. 3) to which the end host sector belongs. When there is a remainder (fraction) of this division, it indicates that part of the disk sector is not specified by the host sector.

(S3) The MPU 3 determines whether there is a fraction.

(S4) When there is a fraction, the MPU 3 stages the data of the converted disk sector addresses ('a' and 'a+1' in FIG. 3) from the disk 8 to the cache area 4-1 of the buffer memory 4. The write data sent from the host 1 are expanded in the receiving area (write data area) 4-2 (see FIG. 7) of the buffer 4. In addition the MPU 3 updates the sector data 'a', 'a+1' of the cache area 4-1 with the write data. In FIG. 3, there is a request to write the 5 sector/512 byte data from address [4a+1], so the data of addresses [4a+1] to [4b+1] are rewritten.

(S5) Next, the MPU 3 writes (saves) the sector data 'a', 'a+1' of the cache area 4-1 in the alternate area 8-1 of the disk 8. It is possible to use the sector buffer area in FIG. 4 as this alternate area. The MPU 3 determines whether saving was successful (no write errors). When saving was not successful, the host 1 is notified of the error and operation ends abnormally.

(S6) On the other hand, when saving is successful, the MPU 3 updates (rewrites) the sectors 'a', 'a+1' of the disk 8 with the sector data 'a', 'a+1' of this cache area 4-1. Whether an error occurred is determined by this rewriting.

(S7) When it is determined that a write error occurred, it updates the sectors 'a', 'a+1' of the disk 8 with the data saved in the alternate area (rewrite). The MPU 3 then determines whether this writing was successful (no write error), and when this writing is not successful, it activates the alternate area 8-1. In other words, the alternate address is set as the alternate information of the control area of the disk 8, and operation ends normally.

(S8) On the other hand, when writing or rewriting to the disk 8 in step 6 and step 7 is successful, there is no need for the data in the alternate area. Therefore, the alternate area 8-1 is deactivated. In other words, the flag of the alternate area is set to be invalid, and operation ends normally.

(S9) On the other hand, when the MPU 3 determines that there is no fraction in step S3, it stages the converted data of the disk sector address, from the disk 8 to the cache area 4-1 of the buffer memory 4. The write data that were sent from the host 1 are expanded in the receiving area (write data area) 4-2 (see FIG. 7) of the buffer 4. In addition, the MPU 3 updates the sector data in the cache area 4-1 with write data. In this case, since there is no fraction, in FIG. 3, the sector data 'a' is rewritten for the sector data of the four host sector addresses.

(S10) Next, the MPU 3 updates (rewrites) the sector of disk 8 with the sector data of this cache area 4-1. Whether a write error occurred is determined by this rewriting. When it is determined that a write error occurred, normal alternate processing is performed. In other words, the MPU 3 writes the data in the write area 4-2 of the buffer 4 in the alternate area 8-1 of the disk 8. Also, it activates the flag of the alternate area and sets the address for the destination of the alternate information of the control area of the disk 8. Operation ends normally. When no write error occurs, operation ends normally without performing alternate processing.

Since data in the cache area in disk sector units are saved in the alternate area in this way, it is possible to obtain alternate data in disk sector units when updating the disk with data in the cache area in disk sector units even when a write error occurs.

The data in the cache area are cleared or written over as the aforementioned disk update operation is performed in order for the next process. Therefore, there is a possibility that the data in the cache area will change during writing even when a write error occurs. In this embodiment of the invention, the data are saved separate from the cache area, so it is possible to obtain alternate data in disk sector units.

Moreover, when a write error occurs, the saved data are rewritten to the disk. In other words, the data are immediately rewritten without performing alternate processing while updating the disk, even when a write error occurs. This is because there is a retry when updating the disk when a write error occurs, due to temporary power loss or the like. This makes it possible to prevent unnecessary use of the alternate area. In this case as well, the data in the cache area are cleared or written over as the disk update operation is performed, in order for the next process. Therefore, the data of the alternate area become valid.

Furthermore, when there is no fraction, the saving process is not performed and normal alternate processing is performed. Since the saving process takes time, it is only performed when necessary. Therefore, it is possible to prevent the emulation time from becoming longer.

Moreover, the save area is used as the alternate area. Therefore, when the alternate is necessary, the write operation of the alternate area becomes unnecessary. This makes it possible to improve overall performance.

As a variation, with the alternate area as an area in the buffer 4, it is also possible to apply a method of writing to the alternate area of the disk when alternate processing is necessary. Furthermore, when using a SCSI board, the save area does not have to be a disk area.

Figure 8:
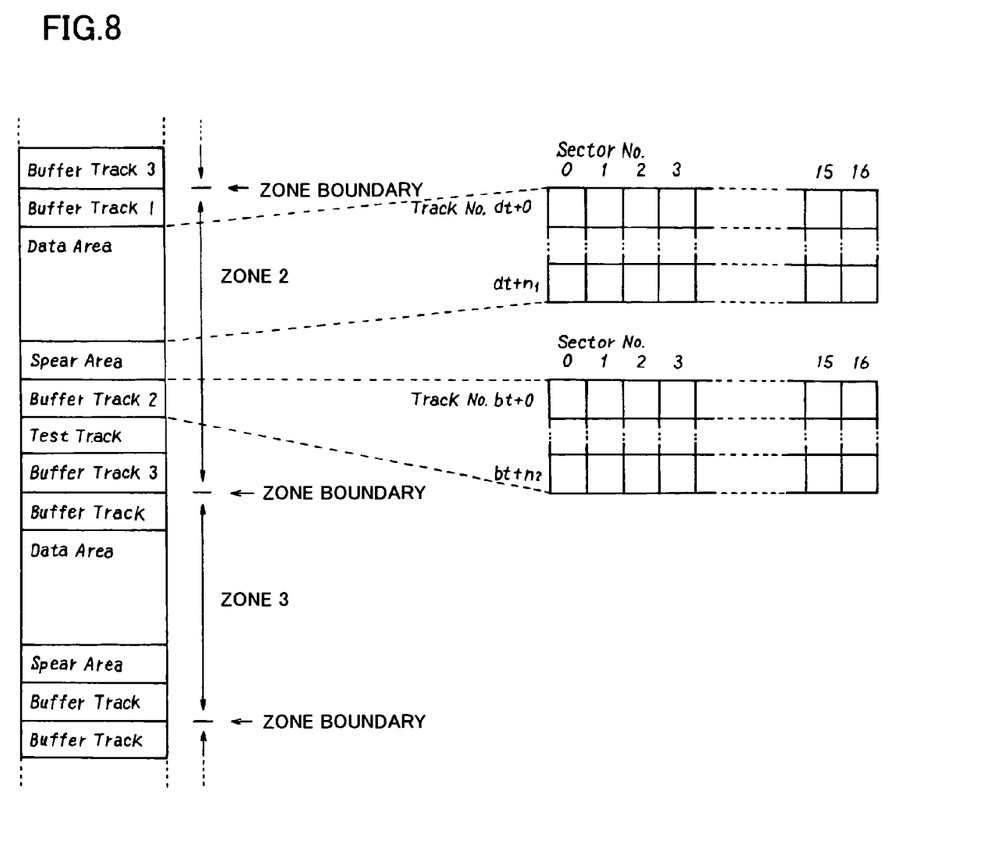
FIG. 8 is drawing explaining the alternate area of the invention.

FIG. 8 is a drawing explaining the alternate area of another embodiment of this invention. As shown in FIG. 8, the magneto-optical disk 8 is divided into a plurality of zones from the inside to the outside. In addition, as mentioned above, the writing frequency of each zone is changed in order to keep the writing density of each zone at an optimum value. There are buffer tracks on the boundary of these zones. A track is an empty area (number of blocks per sector×4 logic tracks). Of these, the buffer track 1 is in the area where zones change, and there are parts that cannot be positioned, however, the buffer tracks 2, 3 are not limited and can be read from or written to.

This empty area is space due to the physical characteristics of the magneto-optical disk device, and it is assigned as the aforementioned alternate area.

Besides this, as mentioned above, since the alternate area is assigned in disk sector units, there is a possibility that there will not be enough alternate area. In that case, it is possible to assign the manufacture zone of the disk, or assign a test track or map area.

Also, in the aforementioned embodiment, the saving process is not performed when there is no fraction, however, when emphasizing the security of the data, it is possible to apply the saving process even when there is no fraction.

Another Emulation Process

Figure 9:
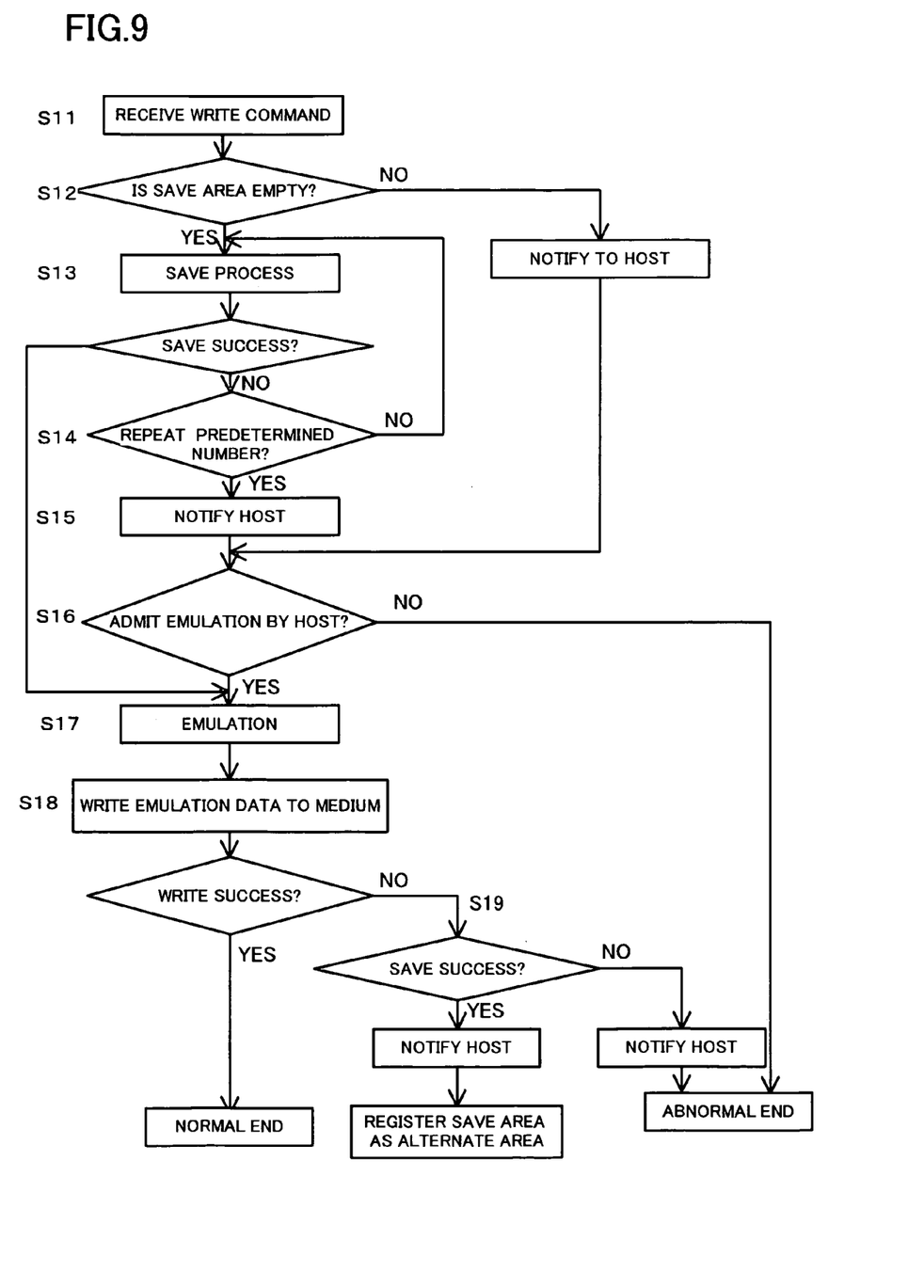
FIG. 9 is a flow chart of the emulation process of another embodiment of the invention.

FIG. 9 is a flowchart of the emulation process of another embodiment of the invention.

(S11) A write command is received from the host 1.

(S12) When the MPU 3 receives a write command by way of the interface 2, it determines whether there is empty space in the storage area (disk or buffer). When there is no empty space in the storage area, the sector data cannot be saved, so it notifies the host 1 and advances to step S16.

(S13) When there is empty space in the storage area, the MPU 3 performs size conversion. It divides the starting address obtained from the LBA of the command by four, and converts it to a disk sector address to which the starting host sector belongs, and from the LBA and number of blocks, it converts it to the disk sector address to which the end sector address belongs. It then stages the converted disk sector address data from the disk 8 to a cache area 4-1 in the buffer memory 4. Also, it writes this staged sector data beforehand to the storage area. It determines whether there is an error in writing to the storage area (write error). When there is no write error, it advances to step S17.

(S14) When there is a write error, it determines whether writing was retried a specified number of times. When it has not been retried the specified number of times it returns to writing in step S13.

(S15) When writing to the storage area is not successful, even after retrying the specified number of times, the MPU 3 notifies the host 1.

(S16) When the host 1 is notified that saving was not successful, the host 1 notifies whether it can or cannot perform emulation. In this case, when the host 1 cannot perform emulation, operation ends abnormally.

(S17) On the other hand, when the host 1 can perform emulation, it executes emulation. In other words, the write data sent from the host are expanded in the receiving area (write data area) of the buffer 4. In addition, the MPU 3 updates the sector data 'a', 'a+1' in the cache area 4-1 with the write data. In FIG. 3 since there is a 5 sectors/512 byte write request starting from address '4a+1', data of address [4a+1] to [4b+1] are rewritten.

(S18) Next, the MPU 3 updates (rewrites) the sectors 'a', 'a+1' of the disk 8 with sector data 'a', 'a+1' in this cache area 4-1. The MPU 3 determines whether a write error occurred from this rewriting. When no write error occurred, operation ends normally.

(S19) When the MPU 3 determines that a write error occurs, it then determines whether saving to the storage area was successful.

When saving to the storage area is successful, it notifies the host 1, then registers the storage area 8-1 in the alternate area. In other words, it sets the flag of the storage area to valid, and sets the alternate address for the alternate information in the control area of the disk 8. Operation then ends normally.

When saving to the storage area is not successful, the MPU 3 notifies the host 1 of that, and then the operation ends abnormally.

In this embodiment of the invention, the sectors that are read are stored beforehand and used as alternate data for emulation during writing. Since the state before writing can be saved when doing this, it is possible to prevent reading errors.

Moreover, since it performed before emulation, the emulation efficiency is good. Furthermore, when storage is not possible, the host is notified, so it is possible to control execution of emulation. When the read sectors cannot be stored when a writing error occurs, the host can perform processing such as a retry.

In addition to the embodiments described above, the invention can be changed as follows.

In the embodiments of the invention described above, an example of using a magneto-optical disk device as the storage device is explained, however, it is possible to use other storage devices such as a magnetic disk device, optical disk device, magnetic card device, or optical card device.

The preferred embodiments of the present invention have been explained, however, the invention is not limited to these embodiments and can be embodied in various form within the scope of the present invention.

As explained above, the present invention has the following effects.

(1) Data defined a first sector length unit that are read or rewritten are saved before writing the rewritten data with actual sector units to the storage medium, so when a writing error occurs while writing, it is possible to save the saved data with first sector length units as alternate data. Therefore, since the data with first sector length units is taken to be alternate data, access in first sector-length units becomes possible using the alternate data even when a read command is received.

(2) Moreover, since the data with first sector length units that are read or rewritten are saved, highly reliable alternate processing is possible.

What is claimed is:

1. An emulation processing method for a storage device that accesses a storage medium defined by a first sector length unit by a command from a host defined by a second sector length unit that is shorter than the first sector length, said method comprising:
   a step of reading data of an address that is specified with a second sector length unit from said storage medium defined by a first sector length unit;
   a step of rewriting said read data defined by said first sector length unit into data defined by said second sector length unit;
   a step of saving said data that is read or rewritten in the first sector length unit into a memory;
   a step of writing said rewritten data to the storage medium; and
   a step of registering said saved and memorized data as alternate data when said writing has failed.

2. The emulation processing method for a storage device of claim 1, wherein said saving step comprises a step of saving the data with the first sector length unit to the storage medium.

3. The emulation processing method for a storage device of claim 1, wherein said reading step comprises a step of staging said data with the first sector length unit to a cache area of a buffer memory from the storage medium.

4. The emulation processing method for a storage device of claim 1, wherein said registering step comprises a step of setting a valid flag to said saved data.

5. The emulation processing method for a storage device of claim 1, further comprising;
   a step of judging whether or not said saving step is successful; and
   a step of performing said rewriting step when said saving step is successful.

6. The emulation processing method for a storage device of claim 1, wherein said reading step comprises a step of staging said data with the first sector length unit to a cache area of a buffer memory from the storage medium when receiving a write command.

7. An emulation processing method for a storage device that accesses a storage medium defined by a first sector length unit by a command from a host defined by a second sector length unit that is shorter than the first sector length, said method comprising:
   a step of reading data of an address that is specified with a second sector length unit from said storage medium defined by a first sector length unit;
   a step of rewriting said read data defined by said first sector length unit into data defined by said second sector length unit;
   a step of saving said data that is read or rewritten in the first sector length unit;
   a step of writing said rewritten data to the storage medium;
   a step of registering said saved data as alternate data when said writing has failed;
   a step of determining whether or not the corresponding all data with said first sector length unit is rewritten from a target address with said second sector length unit of a write request;
   a step of executing said saving step when all of the data are not rewritten; and
   a step of registering to the storage medium as alternate data, said data with said second sector length unit of a write request when said writing has failed, when all of the data is rewritten.

8. An emulation processing method for a storage device that accesses a storage medium defined by a first sector length unit by a command from a host defined by a second sector length unit that is shorter than the first sector length, said method comprising;
   a step of reading data of an address that is specified with a second sector length unit from said storage medium defined by a first sector length unit;
   a step of rewriting said read data defined by said first sector length unit into data defined by said second sector length unit;
   a step of saving said data that is read or rewritten in the first sector length unit;
   a step of writing said rewritten data to the storage medium;
   a step of registering said saved data as alternate data when said writing has failed;
   a step of searching a save area when receiving a write command from a host; and
   a step of notifying that said saving step is not performed when said save area is not found by said searching step.

9. A storage device that accesses a storage medium defined by a first sector length unit by a command from a host defined by a second sector length unit that is shorter than the first sector length, comprising:

a buffer memory; and a control circuit for reading data of the address specified with a second sector length unit from said storage medium to said buffer memory with a first sector length unit, and then rewriting said read data with the first sector length unit to data with the second sector length unit and writing said rewritten data to said storage medium;

wherein said control circuit saves said data that is read or rewritten with the first sector length unit into a storage area, and registers said saved and stored data as alternate data when said writing has failed.

10. The storage device of claim 9, wherein said control circuit saves the data with the first sector length unit to the storage medium.

11. The storage device of claim 9, wherein said control circuit stages said data with the first sector length unit to a cache area of said buffer memory from the storage medium.

12. The storage device of claim 9, wherein said control circuit sets a valid flag to said saved data for said registering.

13. The storage device of claim 9, wherein said control circuit judges whether or not said saving is successful, and performs said rewriting when said saving is successful.

14. The storage device of claim 9, wherein said control circuit stages said data with the first sector length unit to a cache area of said buffer memory from the storage medium when receiving a write command.

15. The storage device of claim 9, further comprising a head for reading and writing to said storage medium.

16. The storage device of claim 9, wherein said control circuit receives a write command from said host of UNIX OS.

17. A storage device that accesses a storage medium defined by a first sector length unit by a command from a host defined by a second sector length unit that is shorter than the first sector length, comprising:

a buffer memory; and a control circuit for reading data of the address specified with a second sector length unit from said storage medium to said buffer memory with a first sector length unit, and then rewriting said read data with the first sector length unit to data with the second sector length unit and writing said rewritten data to said storage medium, wherein said control circuit saves said data that is read or rewritten with the first sector length unit to a storage area, and registers said saved data as alternate data when said writing has failed, and wherein said control circuit further determines whether or not the corresponding all data with said first sector length unit is rewritten from a target address with said second sector length unit of write request, execute said save step when all of the data are not rewritten, and register to the storage medium as alternate data, said data with said second sector length unit of a write request when said writing has failed, when all of the data is rewritten.

18. A storage device that accesses a storage medium defined by a first sector length unit by a command from a host defined by a second sector length unit that is shorter than the first sector length, comprising:

a buffer memory; and a control circuit for reading data of the address specified with a second sector length unit from said storage medium to said buffer memory with a first sector length unit, and then rewriting said read data with the first sector length unit to data with the second sector length unit and writing said rewritten data to said storage medium;

wherein said control circuit saves said data that is read or rewritten with the first sector length unit to a storage area, and registers said saved data as alternate data when said writing has failed, wherein said control circuit searches a save area when receiving a write command from a host, and notifies that said saving is not performed when said save area is not found by said searching.

* * * * *